United States Patent
Mather et al.

(10) Patent No.: US 8,759,709 B2
(45) Date of Patent: Jun. 24, 2014

(54) METHOD AND APPARATUS FOR IMPROVED CUTTING LIFE OF A PLASMA ARC TORCH

(75) Inventors: Jonathan P. Mather, Grafton, NH (US); Peter J. Twarog, West Lebanon, NH (US)

(73) Assignee: Hypertherm, Inc., Hanover, NH (US)

( * ) Notice: Subject to any disclaimer, the term of this patent is extended or adjusted under 35 U.S.C. 154(b) by 0 days.

(21) Appl. No.: 13/478,906

(22) Filed: May 23, 2012

(65) Prior Publication Data

US 2013/0306607 A1 Nov. 21, 2013

Related U.S. Application Data

(63) Continuation of application No. 13/475,393, filed on May 18, 2012.

(51) Int. Cl.
| | |
|---|---|
| B23K 9/00 | (2006.01) |
| B23K 9/24 | (2006.01) |
| B23K 9/16 | (2006.01) |
| H01J 61/28 | (2006.01) |
| H01J 7/24 | (2006.01) |
| H05B 31/26 | (2006.01) |
| B23K 10/00 | (2006.01) |
| H05H 1/34 | (2006.01) |
| B23K 11/30 | (2006.01) |
| H05H 1/28 | (2006.01) |
| H05H 1/46 | (2006.01) |

(52) U.S. Cl.
CPC .......... B23K 10/00 (2013.01); H05H 1/34 (2013.01); B23K 11/3009 (2013.01); H05H 1/28 (2013.01); H05H 1/3405 (2013.01); H05H 1/46 (2013.01)

USPC ........... 219/121.52; 219/121.5; 219/119; 219/121.39; 219/75; 219/121.48; 219/121.49; 313/231.41; 313/231.51; 315/111.21

(58) Field of Classification Search
USPC .............. 219/121.52, 119, 121.39, 75, 219/121.48–121.49; 313/231.41, 231.51; 315/111.21
See application file for complete search history.

(56) References Cited

U.S. PATENT DOCUMENTS

| | | | |
|---|---|---|---|
| 3,408,518 A | | 10/1968 | Strupczewski |
| 3,521,028 A | * | 7/1970 | Wegrzyn .................. 219/146.22 |
| 4,190,636 A | | 2/1980 | Schmerling et al. |
| 4,769,524 A | | 9/1988 | Hardwick |
| 4,924,059 A | | 5/1990 | Rotolico et al. |
| 5,105,061 A | * | 4/1992 | Blankenship ............ 219/121.52 |
| 5,200,594 A | * | 4/1993 | Okada et al. ............. 219/121.52 |
| 5,202,544 A | * | 4/1993 | Inoue et al. ................ 219/121.5 |
| 5,601,734 A | | 2/1997 | Luo et al. |
| 5,767,478 A | * | 6/1998 | Walters .................... 219/121.52 |

(Continued)

Primary Examiner — Dana Ross
Assistant Examiner — Gyounghyun Bae
(74) Attorney, Agent, or Firm — Proskauer Rose LLP (57) ABSTRACT

An improved electrode for use in a plasma arc torch. The electrode includes an electrode body, a cavity in a front face at a first end of the electrode body, and an insert disposed in the cavity. The first end of the electrode body is formed of high purity copper containing at least 99.81% copper. The insert has a first end and a second end and is formed of a high emissivity material. A diameter of the first end of the insert is less than a diameter of a second end of the insert. An electrode is compressed to retain the insert using radial compression. The invention also includes a method for forming the electrode, and a method of operation of an electrode in a plasma torch.

19 Claims, 9 Drawing Sheets

(56) References Cited

U.S. PATENT DOCUMENTS

| | | | |
|---|---|---|---|
| 6,177,647 B1 | 1/2001 | Zapletal | |
| 6,215,091 B1 | 4/2001 | Chung et al. | |
| 6,452,130 B1* | 9/2002 | Qian et al. | 219/121.52 |
| 6,583,378 B1* | 6/2003 | Yamaguchi et al. | 219/121.52 |
| 6,614,001 B2 | 9/2003 | Hackett et al. | |
| 8,035,055 B2 | 10/2011 | Twarog et al. | |
| 2002/0125224 A1* | 9/2002 | Cook et al. | 219/121.48 |
| 2002/0139788 A1* | 10/2002 | McBennett et al. | 219/383 |
| 2004/0232118 A1* | 11/2004 | Horner-Richardson et al. | 219/121.48 |
| 2005/0092718 A1* | 5/2005 | Brandt et al. | 219/121.49 |
| 2006/0102606 A1* | 5/2006 | Twarog | 219/121.82 |
| 2007/0295701 A1 | 12/2007 | Bodroghkozy et al. | |
| 2008/0217305 A1* | 9/2008 | Sanders | 219/121.49 |
| 2008/0237202 A1* | 10/2008 | Twarog et al. | 219/121.52 |
| 2008/0272094 A9* | 11/2008 | Mather et al. | 219/121.52 |
| 2009/0261081 A1 | 10/2009 | Girold et al. | |
| 2010/0252536 A1* | 10/2010 | Spencer et al. | 219/119 |
| 2012/0055906 A1* | 3/2012 | Shipulski et al. | 219/121.49 |

\* cited by examiner

METHOD AND APPARATUS FOR IMPROVED CUTTING LIFE OF A PLASMA ARC TORCH

CROSS REFERENCE TO RELATED APPLICATIONS

This application is a continuation of U.S. patent application Ser. No. 13/475,393, filed on May 18, 2012 and title "Method and Apparatus for Improved Cutting Life of a Plasma Arc Torch," which is owned by the assignee of the instant application and the entirety of which is incorporated herein by reference.

FIELD OF THE INVENTION

The invention generally relates to the field of plasma arc torch systems and processes. More specifically, the invention relates to improved insert configurations in electrodes for use in a plasma arc torch, and methods of operation and manufacturing such electrodes.

BACKGROUND

Figure 1A:
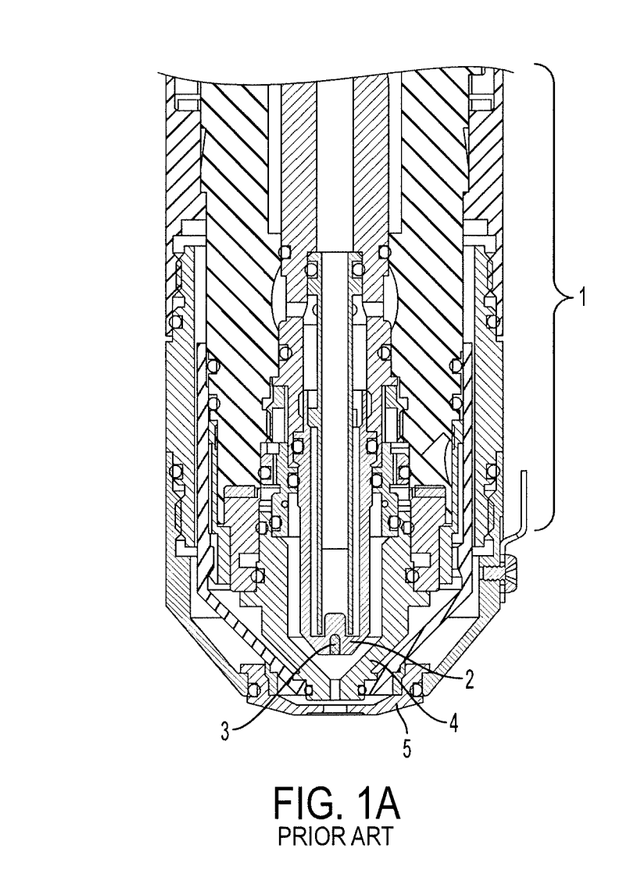
FIG. 1A is a partial sectional view illustrating a known plasma arc torch.

Plasma arc torches are widely used in the high temperature processing (e.g., cutting, welding, and marking) of metallic materials. As shown in FIG. 1A, a plasma arc torch generally includes a torch body 1, an electrode 2 mounted within the body, an insert 3 disposed within a bore of the electrode 2, a nozzle 4 with a central exit orifice, a shield 5, electrical connections (not shown), passages for cooling and arc control fluids, a swirl ring to control the fluid flow patterns, and a power supply (not shown). The torch produces a plasma arc, which is a constricted ionized jet of a plasma gas with high temperature and high momentum. A gas can be non-reactive, e.g. nitrogen or argon, or reactive, e.g. oxygen or air.

In all plasma arc torches, particularly those using a reactive plasma gas, the electrode shows wear over time in the form of a generally concave pit at the exposed emission surface of the insert. The pit is formed due to the loss of molten high emissivity material from the insert. The emission surface liquefies when the arc is generated, and electrons are emitted from a molten pool of the high emissivity material during the operation of the electrode. However, the molten material is ejected from the emission surface during torch operation.

In the process of plasma arc cutting or marking a metallic workpiece, a pilot arc is first generated between the electrode (cathode) and the nozzle (anode). The pilot arc ionizes gas that passes through the nozzle exit orifice. After the ionized gas reduces the electrical resistance between the electrode and the workpiece, the arc is then transferred from the nozzle to the workpiece. Generally the torch is operated in this transferred plasma arc mode, which is characterized by the flow of ionized plasma gas from the electrode to the workpiece, for the cutting, welding, or marking the workpiece.

Figure 1B:
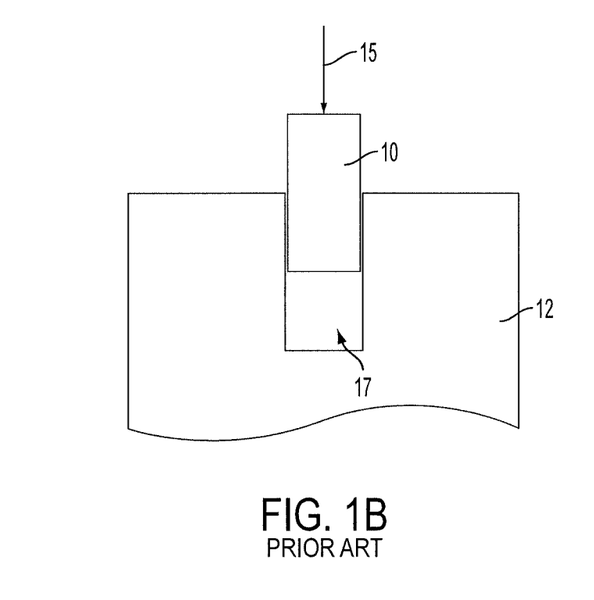
FIG. 1B is a partial sectional view of a plasma arc torch electrode illustrating a known method for assembling an insert into an electrode.

Copper electrode bodies with an insert of high thermionic emissivity material are used in a plasma arc torch with a reactive plasma gas. FIG. 1B illustrates a known method for inserting and securing an insert into the bore of an electrode. FIG. 1B illustrates an emissive insert 10 being pressed 15 into a bore 17 in the end of an electrode body 12, resulting in a press fit electrode insert.

During the operation of plasma arc torch electrodes, torch conditions such as temperature gradients and dynamics work to reduce the retention force holding the insert in place and either allow the insert to move in the bore 17 or to fall completely out of the bore, thereby reducing the service life of the electrode. As described in U.S. Pat. No. 8,101,882 to Hypertherm, Inc., the entire contents of which are incorporated herein by reference, electrodes and inserts can be configured to retain inserts without movement. However, as the plasma arc torch thermally cycles the electrode, retention forces typically degrade and eventually allow some movement of the insert. Further, as described in U.S. Pat. Nos. 5,310,988 and 6,130,399 to Hypertherm, Inc., the insert material melts at the tip of the electrode during operation, creating a pit in the exposed end of the insert. Pit growth occurs until the electrode fails completely, e.g., when the arc emitted from the emissive insert of the electrode attaches to the front copper portion of the electrode body.

What is a needed is an electrode with improved cutting life for a plasma arc torch that better utilizes the insert material within the cavity of the electrode, during operation of the torch.

SUMMARY OF THE INVENTION

The present invention achieves these objectives by configuring an insert within a cavity of an electrode that allows for substantial and controlled movement of the insert during operation and/or thermal cycling of the torch, so that the degradation of the insert during thermal cycling of the torch causing pit growth in the insert is reduced as the insert controllably advances towards a front face of the electrode. Embodiments of the invention achieve these objectives by, for example, reducing pit growth of the insert at a front face of an electrode.

An aspect of the invention features an electrode for a plasma arc torch having a prolonged service life, the plasma arc torch including a plasma chamber defined by the electrode and a nozzle, the electrode comprising an electrode body having a front face, an orifice in the front face of the electrode body, and an elongated emissive insert made of a high thermionic emissivity material and located within the orifice. The insert has a forward end and a rearward end, wherein the forward end of the insert is oriented toward the front face of the electrode body. The insert further has an initial configuration and an operational configuration, the operational configuration being formed after a plurality of operations of the torch, such that in the initial configuration of the insert having the rearward end of the insert is located at a first distance (D1) from the front face, and the operational configuration of the insert having the rearward end located at a second distance (D2), wherein D1 is at least 0.6 mm greater than D2.

In some embodiments, the high thermionic emissivity material includes at least one of hafnium, zirconium or tungsten. In some embodiments, the operational configuration results after at least about 400 arc cycles of the electrode. In some embodiments, a movement of the rearward end of the insert toward the front face is sufficient to compensate for pit formation at the forward end of the insert. In some embodiments, the operation configuration results after at least about 2 hours of electrode operation time. In some embodiments, the movement of the second end of the insert is at least 0.8, 1.0, 1.2, 1.4, 1.6, or 2.0 mm. In some embodiments, the electrode is gas-cooled. In some embodiments, the electrode body is formed of high purity copper containing at least 99.81% copper. In some embodiments, the insert extends out of the orifice away from the second end and beyond the front face.

The invention, in another aspect, features a method for enabling a prolonged electrode service life in a plasma arc torch. The method includes thermally cycling an electrode. The electrode has a body with a first end and a second end and an elongated emitter positioned within a cavity in a face of the first end of the body. During operation of the plasma arc torch an electrode is thermally cycled by emitting a plasma arc from the emitter and cooling the emitter. The cycle of the electrode includes forming a pit in an exposed surface of the emitter by melting a portion of the emitter. The cycle of the electrode also includes advancing the emitter away from the second end of the electrode body toward the first end of the electrode body such that the advancement of the emitter toward the first end of the electrode body is greater than a growth of the pit relative to the face.

In some embodiments, during operation of the electrode, a second end of the emitter is advanced toward the front face of the electrode during cutting cycles such that the second end of the emitter advances at least 0.6 mm toward the face. In some embodiments, the advancement of the second end of the emitter is at least 0.8, 1.0, 1.2, 1.4, 1.6, or 2.0 mm. In some embodiments, the electrode is gas-cooled. In some embodiments, the electrode body is formed of high purity copper containing at least 99.81% copper. In some embodiments, the insert extends out of the cavity away from the second end of the electrode body and beyond the face.

The invention, in another aspect, features a method for extending service life of an electrode for a plasma arc torch. The method includes the step of fanning a pit in a first end of an insert. The insert is formed of a high thermionic emissivity material and disposed within a cavity in a front face at a first end of the electrode. The electrode can be formed of high purity copper. The electrode is formed of high purity copper containing at least 99.81% copper. The insert has an initial configuration and an operational configuration. The operational configuration is formed after a plurality of operations of the plasma arc torch. The method includes cycling the electrode thermally, thereby causing melting of a portion of the insert based upon emission of a plasma arc from the insert during each operation of the torch. The insert advances toward the front face of the electrode in connection with the thermal cycling. The method includes preventing a premature failure of the electrode due to the advancement of the second end of the insert toward the front face of the electrode. The advancement is a distance of at least 0.6 mm during the thermal cycling of the torch. The initial configuration of the rearward end of the insert is located at a first distance (D1) from the front face. The operational configuration of the rearward end of the insert is located at a second distance (D2), wherein D1 is at least 0.6 mm greater than D2.

In some embodiments, the insert has a diameter of the first end less than a diameter of a second end. In some embodiments, the second end of the insert is opposite the first end of the insert.

The invention, in another aspect, features an electrode for a plasma arc torch, the plasma arc torch including a plasma chamber defined by the electrode and a nozzle. The electrode has an electrode body having a first end formed of high purity copper. The high purity copper contains at least 99.81% copper. The electrode body has a second end that is opposite the first end. The electrode body has a front face located at the first end. The electrode has a cavity located in the front face of the electrode body. The electrode has an elongated insert formed of a high thermionic emissivity material. The elongated insert is disposed in the cavity. The insert has a first end and a second end. The first end of the insert is oriented toward the front face of the electrode body. The insert has a diameter of the first end less than a diameter of the second end. The electrode is configured to retain the first end of the insert. The electrode is configured to retain the insert.

In some embodiments, the first end of the electrode body is configured to retain the first end of the insert by radial compression. In some embodiments, the first end of the electrode body is configured to retain the insert by radial compression. In some embodiments, during operation of the electrode the second end of the insert is advanced toward the front face of the electrode during arc cycles. The second end of the insert can advance at least 0.6 mm toward the front face of the electrode body.

In some embodiments, the advancement of the second end of the insert is at least 0.8, 1.0, 1.2, 1.4, 1.6, or 2.0 mm. In some embodiments, the electrode is gas-cooled. In some embodiments, the insert extends out of the cavity away from the second end of the electrode body and beyond the front face. In some embodiments, the insert is formed of hafnium, zirconium, or tungsten.

The invention, in another aspect, features a method for extending service life of an electrode for a plasma arc torch. The method includes the step of forming a pit in a first end of an insert. A portion of the insert is melted during operation of the plasma arc torch. The insert is formed of a high thermionic emissivity material. The insert has a diameter of the first end less than a diameter of a second end. The insert is disposed in a cavity in a front face at a first end of an electrode body. The electrode body is formed of high purity copper containing at least 99.81% copper. The method includes thermally cycling the electrode by emitting a plasma arc from the insert during operation of the torch. The insert advances toward the front face of the electrode, the insert advancing in connection with the thermal cycling. The method includes preventing a premature failure of the electrode during operation of the plasma arc torch due to the advancement of the second end of the insert toward the front face of the electrode. The second end of the insert advances a distance of at least 0.6 mm.

In some embodiments, an electrode practices the method as described above, including forming a pit in a first end of an insert. A portion of the insert is melted during operation of the plasma arc torch. The insert is formed of a high thermionic emissivity material. The insert has a diameter of the first end less than a diameter of a second end. The insert is disposed in a cavity in a front face at a first end of an electrode body. The electrode body is formed of high purity copper, containing at least 99.81% copper. The electrode practices the method as described above of thermally cycling the electrode by emitting a plasma arc from the insert during operation of the torch. The insert advances toward the front face of the electrode, the insert advancing in connection with the thermal cycling. The method includes preventing a premature failure of the electrode during operation of the plasma arc torch due to the advancement of the second end of the insert toward the front face of the electrode. The second end of the insert can advance a distance of at least 0.6 mm.

In some embodiments, the advancement of the second end of the insert is at least 0.8, 1.0, 1.2, 1.4, 1.6, or 2.0 mm. In some embodiments, the insert is formed of at least one of hafnium, zirconium, or tungsten. In some embodiments, the advancement of the insert toward the front face of the electrode offsets a growth of a pit depth that results from the electrode cycling. In some embodiments, the advancement of the insert occurs at a greater rater than the growth of the pit depth. In some embodiments, the advancement of the insert occurs at the same rate as the growth of the pit depth. In some embodiments, the electrode body is configured to retain the insert by radial compression. In some embodiments, the first end of the electrode body is configured to retain the insert by radial compression.

The invention, in another aspect, features a method for manufacturing an electrode for a plasma arc torch, the plasma arc torch including a plasma chamber defined by an electrode and a nozzle. The method includes forming an electrode body having a first end formed of high purity copper. The electrode body is formed of high purity copper containing at least 99.81% copper. The electrode body has a second end that is opposite the first end. The electrode body has a front face located at the first end of the electrode body. The method includes forming a cavity in the front face of the electrode body. The method includes assembling an elongated insert formed of a high thermionic emissivity material in the cavity. The insert has a first end and a second end. The first end of the insert is oriented toward the front face of the electrode body. The method includes configuring the first end of the body. The first end of the insert is retained using radial compression of the first end of the electrode body. Radial compression is used to retain the insert in the first end of the electrode body.

In some embodiments, the insert has a taper. In some embodiments, a first diameter at a first end of the insert is less than a second diameter at a second end of the insert. In some embodiments, the first end of the insert is near the front face of the electrode body. In some embodiments, the second diameter is at least 0.003" greater than the first diameter. In some embodiments, the insert has a length between the first diameter and the second diameter between about 3.0 mm and 5.0 mm.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE DRAWINGS

Reference will now be made in detail to embodiments of the invention, one or more examples of which are illustrated in the figures. Each embodiment described or illustrated herein is presented for purposes of explanation of the invention, and not as a limitation of the invention. For example, features illustrated or described as part of one embodiment can be used with another embodiment to yield still a further embodiment. It is intended that the present invention include these and other modifications and variations as further embodiments.

Figure 2A:
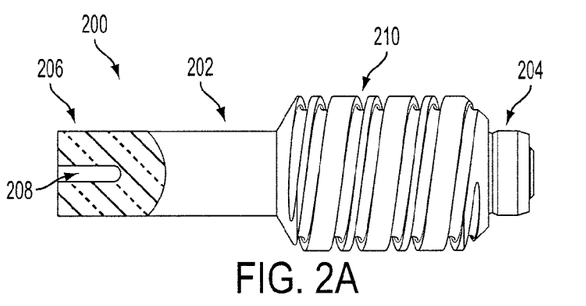
FIG. 2A is a sectional view of a plasma arc torch electrode illustrating an electrode having a cavity prior to assembl.

FIGS. 2A-2E illustrate an exemplary method for securing an insert into an electrode cavity and depict the resulting electrode configuration incorporating principles of the present invention. FIG. 2A illustrates an initial configuration of an electrode 200 comprising an electrode body 202 having a first end 206 and a second end 204 that is opposite the first end 206. An orifice 208 can be formed at the first end of the electrode body 206. In some embodiments, an orifice 208 can be formed in a front face of the first end of the electrode body 206. In some embodiments, the orifice 208 is substantially cylindrical. The orifice 208 can have other configurations as well, located at the first end of the electrode body 206, in accordance with principles of the present invention. In all embodiments, the orifice 208 can also be a bore. A bore 208 can be substantially cylindrical. In all embodiments, an inside bottom face of the bore 208 can have a flat end surface or a tapered surface, e.g., a drill bit point. In all embodiments, the orifice (or bore) 208 can also be a cavity. The first end of the electrode body 206 can be formed of high thermal conductivity material, for example, high purity copper containing at least 99.81% copper. The first end of the electrode body 206 or the electrode body 202 can be formed of high purity copper containing 99.85%, 99.90%, 99.95% or 99.99% copper, in accordance with principles of the present invention. In some embodiments, the copper can be oxygen-free high conductivity copper. The electrode body 202 can also be formed of high purity copper. In some embodiments, the electrode 200 is formed of high purity copper comprising at least 99.81% copper. In some embodiments, the electrode 202 is gas-cooled, e.g., using cooling channels 210.

Figure 2B:
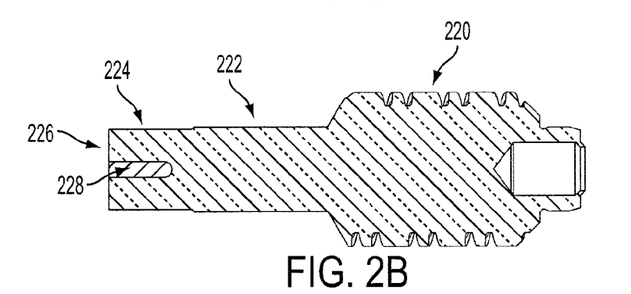
FIG. 2B is a sectional view illustrating an electrode after assembling an insert into the electrode body, and radially compressing the end to retain the insert.
Figure 2C:
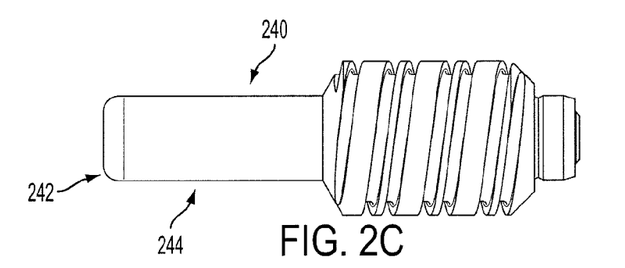
FIG. 2C is a sectional view illustrating an electrode having a machined first end and front face.

FIG. 2B illustrates an electrode 220 after an elongated emissive insert 228 is inserted into the bore 208 at a front face of the electrode 226. The front face of the electrode 226 can be located at the first end of the electrode body 206. In some embodiments, the insert 228 can be formed of a high thermionic emissivity material, for example, hafnium, zirconium, or tungsten. The bore 208 can have a larger diameter than a diameter of an insert, so that the insert 228 initially fits loosely in the bore 208. In some embodiments, the bore 208 has a diameter larger than an insert 228 having a diameter at a first end and a diameter at a second end, providing an initial loose assembly of the insert 228 into the bore 208. The insert 228 can have a forward end and a rearward end, where the forward end is oriented toward the front face of the electrode body 226 when inserted into the bore 208, and the forward end can have a smaller diameter than the rearward end. The rearward end can be opposite the forward end. The first end of the electrode body 206 can be compressed, e.g., using radial swaging techniques, resulting in a compressed first end of the electrode 224. Compression of the electrode body 206 can be accomplished using hydraulic pressure during swaging. The compressed first end of the electrode 224 can have a smaller diameter than the electrode body 202. Material deformation from radial compression can result in the first end of the electrode 224 to at least partially conform to the insert 228. In some embodiments, the compressed first end of the electrode 224 includes the entire length of the elongated insert 228. In some embodiments, the compressed first end of the electrode 224 includes at least a portion of the elongated insert 228. FIG. 2C illustrates an electrode 240 after the electrode body 244 is machined to a uniform diameter. The front face of the electrode 226 can be also machined, creating a rounded edge 242 of the electrode body 244.

Figure 2D:
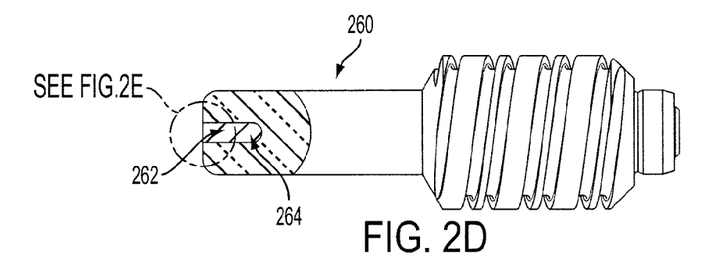
FIG. 2D is a sectional view illustrating a finished electrode.
Figure 2E:
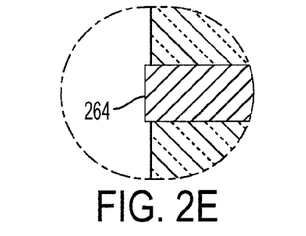
FIG. 2E is a close up sectional view of an insert retained in a finished electrode.

FIGS. 2D-2E illustrate a finished electrode 260. In some embodiments, the front face of the electrode 226 is machined so that the exposed first end of the insert 262 extends beyond the front face 226, out of the bore of the electrode body 244 in a direction away from the second end 204. In some embodiments, the electrode 260 can be gas-cooled. Gas-cooled electrodes can be more susceptible to extremes of temperature variation throughout an arc cycle than liquid-cooled electrodes. Liquid-cooled electrodes can have steadier temperatures over the cycle of the electrode. In some embodiments, a gas-cooled electrode 260 is exposed to greater thermal variations, and the electrode 260 becomes hotter than a liquid-cooled electrode in an arc cycle. The greater thermal variations in the gas-cooled electrodes can allow for greater thermal flexing between the insert 228 and the electrode body 244. Thermal flexing between the insert 228 and the electrode body 244 can allow the insert to move in the bore 208 during operation of the torch, as shown and discussed later with respect to FIGS. 3A-3E. For example, greater thermal variations in the gas-cooled electrodes can allow for relative motion between the insert 228 and the electrode body 244 due to differences in thermal expansion between the insert 228 and the electrode body 244. This relative motion can cause the insert 228 to move in the bore 208 during operation.

In some embodiments, a diameter at the first end of the insert 262 is less than a diameter at the second end of the insert 264. The insert can have a tapered conical configuration. In some embodiments, the insert 228 is oriented so the first end of the insert 262 is towards the front face of the electrode body 226. In some embodiments, the diameter at the second end of the insert 264 is at least 0.003" greater than the diameter at the first end of the insert 264. In some embodiments, the length of the insert 228 between the diameter at the first end of the insert 262 and the second end of the insert 264 before operation of the electrode is between at least 3.0 mm and 5.0 mm. In some embodiments, the compressed first end of the electrode 224 exerts a compressive force against an outer surface at the first end of the insert 262 and a compressive force against an outer surface at a second end of the insert 264. In some embodiments, the compressive force at the first end of the insert 262 is greater than the compressive force at the second end of the insert 264. An electrode in accordance with principles of the present invention can be configured in a plasma arc torch that includes a plasma chamber defined by the electrode and a nozzle.

Figure 3A:
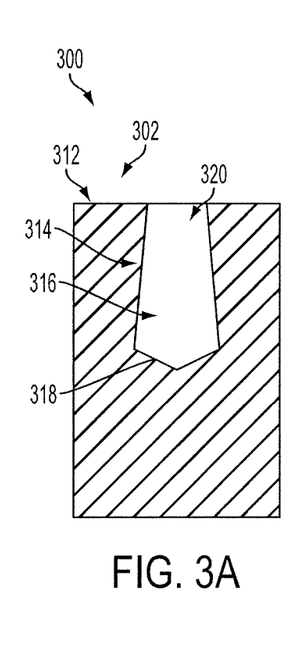
FIGS. 3A-3E illustrate insert movement during a cycle of a plasma arc torch.

FIGS. 3A-3E illustrate an exemplary method for extending service life of an electrode for a plasma arc torch. FIGS. 3A-3E illustrate a complete thermal cycle of a plasma torch electrode according to an embodiment of the invention. FIG. 3A illustrates an initial configuration of an electrode 300 having an electrode body 302 and an elongated emissive insert 314. The electrode body 302 can be formed of a high thermal conductivity material. The insert 314 can have a first end 320 and a second end 316, with the first end 320 oriented towards a front face of the electrode body 312. The insert 314 can be disposed within a cavity in a front face at the first end of the electrode. The first end of the electrode 320 can be configured to retain the insert 314 using radial compression. The compressed electrode body 312 can at least partially conform to the insert 314. In some embodiments, the front face of the electrode body 312 can be flush with the first end of the insert 320. In some embodiments, the first end of the insert 320 can protrude out of the cavity away from the surface of the front face of the electrode body 312 in the initial configuration. When insert material extends beyond the electrode body, a plasma arc can be less likely to wander during operation. In a new electrode, a plasma arc, discussed later, can emit from an emissive insert at or near the front face of the electrode body 312, prematurely wearing the electrode. After an electrode completes one or more arc cycles, discussed in detail below, a pit at the exposed end of the insert 314 can dictate the location of the plasma arc, preventing the arc from wandering.

With respect to FIG. 3A, configuration of the insert 314 and electrode body 302 can include a tapered depression end surface 318, for example, formed by a drill point, with which the second end of the insert 316 can be configured to mate. The end surface 318 can have other configurations as well, which can mate with a second end of the insert 316 in accordance with principles of the present invention. The electrode body 302 can be formed of a high thermal conductivity material, for example, copper or copper alloy, including high purity copper containing at least 99.81% copper. Oxygen-free high conductivity copper can also be used. In some embodiments, the electrode 300 is formed of high purity copper comprising at least 99.81% copper. In some embodiments, high purity copper electrodes containing less than 99.81% copper do not allow an insert 228 to advance in the cavity of the electrode. The insert 314 can be formed of a high thermionic emissivity material, such as at least one of hafnium, zirconium, or tungsten. The electrode 300 can include passages integrally formed about the electrode body 302, which can function as heat transfer surfaces to cool the electrode body 302 during torch operation. See, e.g., 210 of FIG. 2A. Gas-cooled electrodes can be subject to extremes of greater variation in temperatures during an arc cycle, or plurality of cycles, than liquid-cooled electrodes. The greater thermal variations in gas-cooled electrodes can allow thermal flexing of the insert 314. The electrode 300 can heat and expand during operation, allowing the insert 314 to move in the bore of the electrode body 302. Additionally, the insert 314 and electrode 300 can be formed of different materials having different coefficients of thermal expansion. The heating and expanding 326, 332, 338 of the insert 314 and the heating and expanding of the electrode body 335, 342 can be different based on being formed of different materials, described in detail later. The differences in expansion of the two materials during thermal variations of a cycle can allow the insert 314 to move in the bore of the electrode body 302. The exposure of higher temperatures creates thermal flexing in the insert 314 which can allow the insert 314 to advance towards the front face of the electrode body 312.

As shown in FIG. 3A, an insert 314 can have at least a diameter at a first end 320 and a diameter at a second end 316. In some embodiments the diameter at the first end 320 and the diameter at the second end are not equal, and the diameter at the first end 320 can be less than the diameter at the second end 316. In some embodiments, the first end of the insert 320 is aligned towards the front face of the electrode body 312, and the diameter at the second end of the insert 316 can be at least 0.003" greater than the diameter at the first end of the insert 320. In some embodiments, a length of the insert 314 is between about 3.0 mm and 5.0 mm.

Figure 3B:
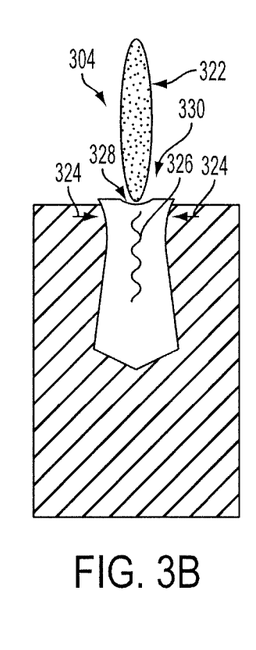
Figure 3C:
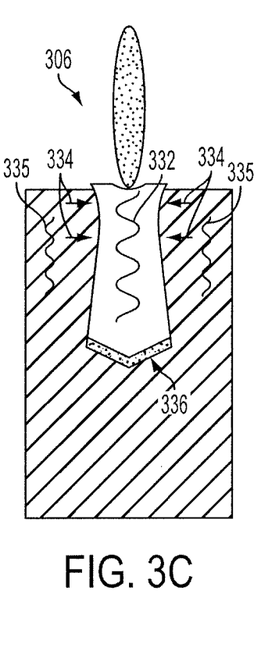
Figure 3D:
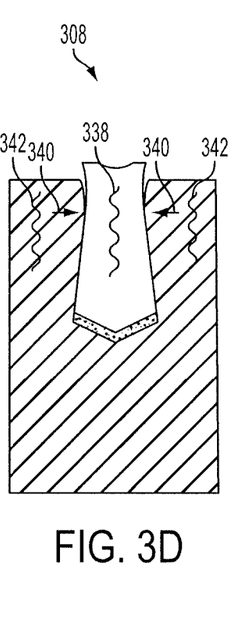
Figure 3E:
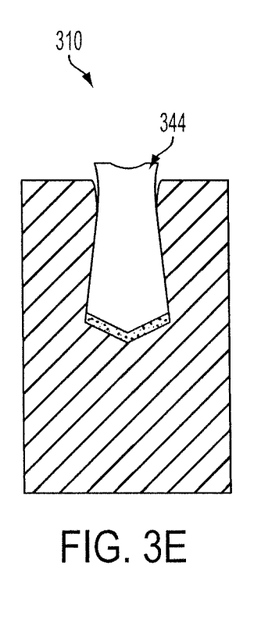

FIG. 3B illustrates a configuration 304 at initial start up of a plasma arc torch. As current passes through the elongated emissive insert 314, a plasma arc 322 can be generated. The insert can begin to heat and expand 326, pushing against the electrode body 302 and affecting retention forces 324. A portion of an exposed first end of the insert can begin to melt 330, forming a pit 328 at the exposed first end of the insert 320 due to loss of melted emissive material. After one or more arc cycles, the pit 328 can exist in the insert 314 prior to generating the plasma arc 322. FIG. 3C illustrates a configuration of the electrode 306 during operation of the plasma arc torch. It is believed that as the insert continues to fully heat and expand 332, a portion of the electrode body similarly heats and expands 335. The insert 314 and electrode body 302 can be formed of materials having different coefficients of thermal expansion. The heating and expansion of the insert 332 can be different from the heating and expansion of the electrode body 335. In some embodiments, during this process, localized expansion of the electrode body 302 and insert 314 can change retention forces 334 between the electrode body 302 and the insert 314 causing the insert 314 to incrementally advance towards the front face of the electrode 312. The melting 330 of the exposed first end of the insert can be simultaneous with a second end of the insert 316 advancing toward the front face of the electrode 312. Irrespective of the mechanism, a gap 336 can be created between the second end of the insert 316 and the end surface 318 at the base of the bore. FIG. 3D illustrates a configuration of an electrode 308 at termination of a cycle immediately after the plasma arc 322 is extinguished. The insert heating and expanding 338 is reduced after the plasma arc 322 is terminated, similarly reducing the electrode body 302 heating and expansion 342. The electrode body 302 can cool more rapidly than the insert 314, reducing the forces near the first end of the insert 320. The electrode body 302 can contract as it cools, reducing the retention forces 340 so the insert 314 is not pulled back into the cavity of the electrode body and the gap 336 between the second end of the insert 316 and the end surface 318 at the base of the bore can remain. Finally, FIG. 3E illustrates a configuration of the electrode 310 after the insert 314 and electrode body 302 have cooled to ambient temperature. The insert 314 shifted position in the cavity of the electrode to a raised position 344 above the front face of the electrode 312. The pit 328 at the first end of the electrode 320 remains after the insert 314 and electrode body 302 have cooled. The gap 336 formed in 3C (described above) remains after the insert 314 and electrode body 302 have cooled.

In some embodiments, the electrode body 302 and insert 314 can be operated many times, cycling through the thermal cycle process of FIGS. 3A-3E more than once, resulting in an operational configuration after a plurality of operations of the plasma torch. An arc cycle can be defined as each time the plasma arc 322 initiates and terminates (turns on and off). However, it is not necessary for an arc to be completely extinguished before commencing a subsequent arc cycle. In all embodiments, one or more arc cycles can also form one or more cutting cycles. In all embodiments, arc cycles (or cutting cycles) can also form one or more thermal cycles. The plurality of operations of the plasma torch can be a plurality of cutting cycles. Of course, a cutting cycle according to the invention does not require that the electrode commence or finish operation at ambient temperature, as a full cool down is not required to commence the next cycle. During each cycle, e.g., shown in FIGS. 3A-3E, a portion of the insert melts 330, which tends to result in pit growth 328. However, the controlled movement of the insert 314 that results from the invention causes a controlled, relatively linear, increase in the gap 336 between the second end of the insert 316 and the end surface 318 as the emissive material is consumed over the various torch cutting cycles. An electrode can be operated for a plurality of arc cycles, allowing an insert 314 to move some distance during each cycle. Insert movement in the electrode body 302 can maintain sufficient insert material near the front face of the electrode body 312 during the service life of an electrode. This movement over a specified number of cycles can provide a rate of insert movement. The rate of movement can allow an electrode to be monitored and replaced prior to failure in a torch. The rate of movement of the insert 314 can be at least as great as the growth of the pit 328, preventing a premature failure of the electrode during operation of the plasma arc torch since replenishment of the emissive material at the front face of the electrode retards pit formation and prevents premature attachment of the plasma arc to the copper electrode material. As the insert 314 advances towards the front face of the electrode body 312 during the various cutting cycles, the advancement of the emissive material can offset the pit depth growth 328. As discussed below, in some embodiments, the gap 336 can be at least 0.6 mm and more.

As discussed later and shown in FIGS. 5 and 6, in some embodiments an insert advances in an electrode body creating a gap 336 between at least 0.6 mm and 2.0 mm between the second end of the insert 316 and the end surface 318 of the bore. In some embodiments, the second end of the insert 316 advances at least between 0.6 mm and 2.0 mm towards the front face of the electrode 312. Also, the amount of insert 314 movement (migration) in the bore of the electrode body 302 can be related to the number of thermal cutting cycles. As discussed and shown later in FIG. 6, an electrode can be operated many times in a plasma torch, resulting in a plurality of thermal cycles, causing further insert advancement with additional cut cycles.

More specifically, as depicted in FIG. 3A, in some embodiments, an initial configuration of the insert 314 has the rearward end of the insert 316 located at a first distance (D1) from the front face of the electrode body 312. D1 can be the length of the insert when the insert is fully seated in the cavity of the electrode body. After a plurality of operations of the torch, as shown in FIGS. 3A-3E, the operational configuration of the insert 314 has the rearward end of the insert 316 located at a second distance (D2). After operations of the torch, D1 can be at least 0.6 mm greater than D2. The advancement of the second end of the insert by a distance of D1 minus D2 prevents premature failure of the electrode, as emissive material is restored towards the front face of the electrode. In some embodiments, the operational configuration after a plurality of operations results after at least about 400 arc cycles of the electrode. In some embodiments, the operational configuration after a plurality of operations as shown in FIGS. 3A-3E results after at least about 2 hours of electrode operation time. Electrode operation time can be the time the plasma arc 322 is on, when the torch is in operation. In some embodiments, the rearward end of the insert 316 advances during a plurality of operations as shown in FIGS. 3A-3E at a rate at least as great as a rate of pit formation 328 at the forward end of the insert 320, preventing a premature failure of the electrode during operation of the plasma arc torch. Movement at the rearward end of the insert 314 toward the front face can be sufficient to compensate for pit growth at the front end of the insert. In some embodiments, the movement at the rearward end of the insert 314 exceeds a distance of at least 0.6 mm. In some embodiments, the total movement at the rearward end of the insert 314 is at least a distance of 0.6 mm, at least a distance of 0.8 mm, at least a distance of 1.0 mm, at least a distance of 1.2 mm, at least a distance of 1.4 mm, at least a distance of 1.6 mm, or at least a distance of 2.0 mm. In some embodiments, the total movement at the rearward end of the insert 314 is greater than 2.0 mm.

An electrode body 302 can have a first end and a second end, with an exposed surface face at the first end of the electrode body. In all embodiments, an insert 314 can also be an emitter. In some embodiments, the emitter 314 is disposed in a cavity at the first end of the electrode body 302. In some embodiments, an end of the emitter 314 extends out of the cavity beyond the surface face at the first end of the electrode body. A first end of the electrode body can be formed of high purity copper containing at least 99.81% copper. Oxygen-free high conductivity copper can also be used. In some embodiments, the electrode body 302 can be formed of high purity copper. In some embodiments, the high purity copper contains at least 99.81% copper. During operation of the plasma arc torch, as shown in FIGS. 3A-3C, the plasma arc torch emits a plasma arc 322 from the emitter 314. At termination of the plasma arc 322, the emitter 314 and electrode body 302 cool, as shown in FIGS. 3D-3E. Arc cycling results in farthing a pit 328 at the exposed end of the emitter 320 when a portion of the emitter melts 330. The emitter can advance from the second end of the emitter 316 to the first end of the emitter 320 at a rate greater than the rate of pit growth 328 relative to the exposed surface of the electrode body 302. The second end of the emitter can advance toward the surface face at the first end of the electrode body a distance between at least 0.6 mm and at least 2.0 mm. In some embodiments, the second end of the emitter can advance greater than 2.0 mm. In some embodiments, when the electrode body 302 is partially conformed in compression around an insert 314 (e.g., by radial compression), the body 302 applies a force against the insert 314. The electrode body can apply a compressive force against a first end of the insert 320, and it can also apply a compressive force against a second end of the insert 316. In some embodiments, the force at the first end of the insert 320 is greater than the force at the second end of the insert 316. As a result of compression of the electrode body 202 around the insert 314, the insert can be effectively retained in the cavity of the electrode body 202 through many electrode cutting cycles.

Figure 4A:
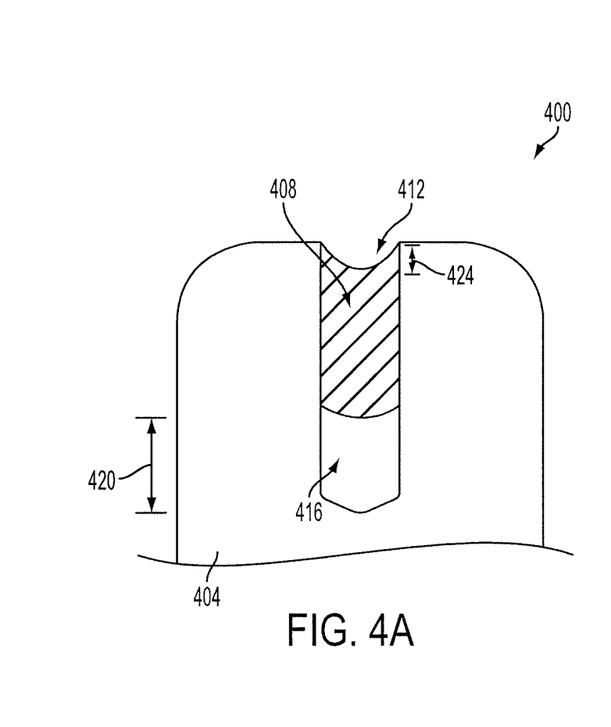
FIG. 4A is a sectional view illustrating insert movement due to thermal cycling of an electrode within a plasma arc torch in accordance with an embodiment of the invention.
Figure 4B:
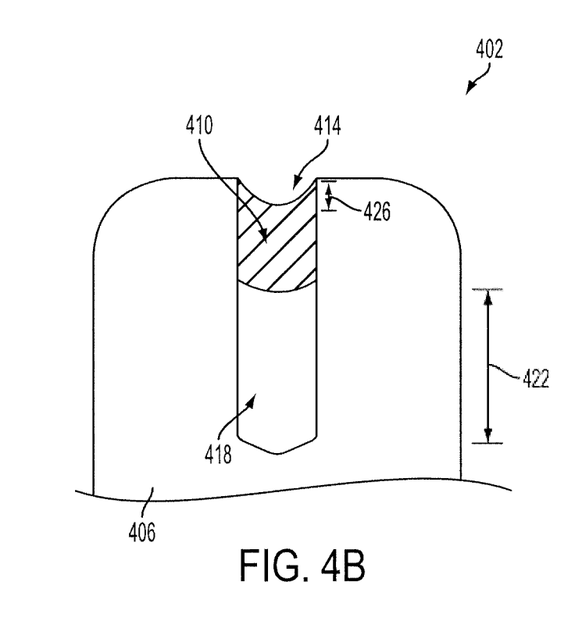
FIG. 4B is a sectional view illustrating insert movement due to thermal cycling of an electrode within a plasma arc torch in accordance with another embodiment of the invention.

FIGS. 4A-4B illustrate an electrode after a plurality of arc cycling FIGS. 3A-3E. FIG. 4B shows an electrode 402 having a higher total number of cycles than an electrode 400 shown in FIG. 4A. FIG. 4A shows an electrode 400 having an electrode body 404 and an elongated insert 408. The insert 408 can be formed of high thermionic emissivity material. After a plurality of thermal cycles, insert 408 advances a distance 420 to create a gap 416, sacrificing insert material to maintain a pit 412 having a distance from a face of the electrode body to the deepest portion of the pit 424. FIG. 4B shows an electrode 402 having an electrode body 406 and an elongated insert 410. The insert 410 can be formed of high thermionic emissivity material. After a plurality of thermal cycles, insert 410 advances a distance 422 to create a gap 418, so that insert material is used to maintain a pit 414 having a distance from the electrode body to the deepest portion of the pit 426. After a higher total number of thermal cycles, the insert 410 advances a distance 422 creating a gap 418, while a pit 414 remains substantially the same as the pit 412 after a lower total number of thermal cycles. The distance 424, 426 can remain substantially similar throughout the life of the electrode 400, 402. The insert 408, 410 can advance between at least a distance of 0.6 mm to at least a distance of 2.0 mm after a plurality of thermal cycles. In some embodiments, the insert 408, 410 advances a total distance greater than 2.0 mm. In some embodiments, the electrode body 404, 406 is formed of high purity copper. In some embodiments, the electrode 400, 402 contains high purity copper comprising at least 99.81% copper. In some embodiments the insert 408, 410 can be formed of at least one of hafnium, zirconium, or tungsten.

Experimental testing during development of the present invention was undertaken using a Powermax 1650 power supply and a Duramax MRT 25' torch with an electrode (part number 220777), nozzle (part number 220990), swirl ring (part number 220994), retaining cap (part number 220854), and shield (part number 220993), all manufactured by Hypertherm, Inc. of Hanover, N.H. All testing included electrodes having a tapered hafnium insert retained using radial compression into an electrode body formed of high purity copper containing 99.81% copper. The plasma torch was operated at 100 amps of transferred current in a plurality of arc cycles for a cycle time of 20 seconds, with 5 second intervals between each cycle, with the results listed below:

| Cycle | Average Movement (mm) | Standard Deviation |
| --- | --- | --- |
| 180 | 0.68 | 0.24 |
| 360 | 1.33 | 0.06 |
| 540 | 2.04 | 0.20 |
| 720 | 2.45 | 0.10 |

Figure 5:
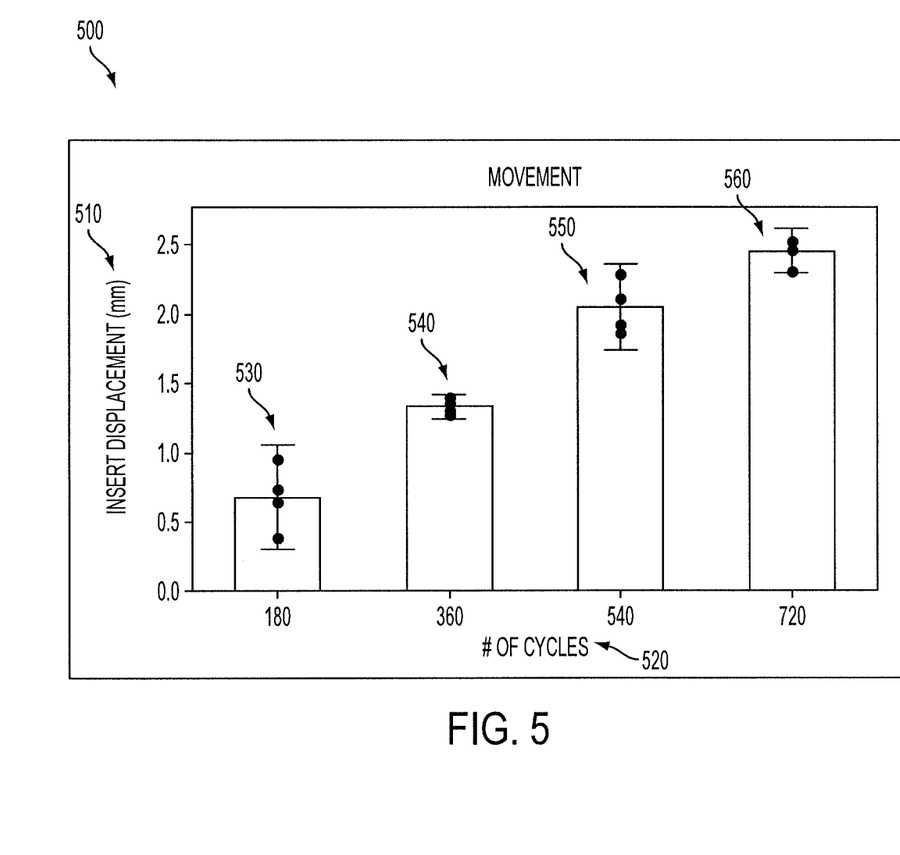
FIG. 5 is a chart depicting insert movement after a number of cycles in accordance with an aspect of the invention.

FIG. 5 is a chart 500 showing the test results. Testing involved running a plurality of electrodes a set number of cycles 520 and measuring the insert displacement 510. The tests all show a substantially linear rate of movement of the insert over a total of 720 cycles. The insert moved on average 0.68 mm 530 during cycle 0 to cycle 180, resulting in a rate of change of 0.004 mm/cycle. The insert moved on average an additional 0.65 mm during cycle 181 to cycle 360, for a total movement of 1.33 mm 540 and total rate of change of 0.004 mm/cycle. The insert moved on average an additional 0.71 mm during cycle 361 to cycle 540, for a total of 2.04 mm 550 and total rate of change of 0.004 mm/cycle. The insert moved on average an additional 0.41 mm during cycle 541 to cycle 710, for a total movement of 2.45 mm 560 and total rate of change of 0.003 mm/cycle.

Figure 6:
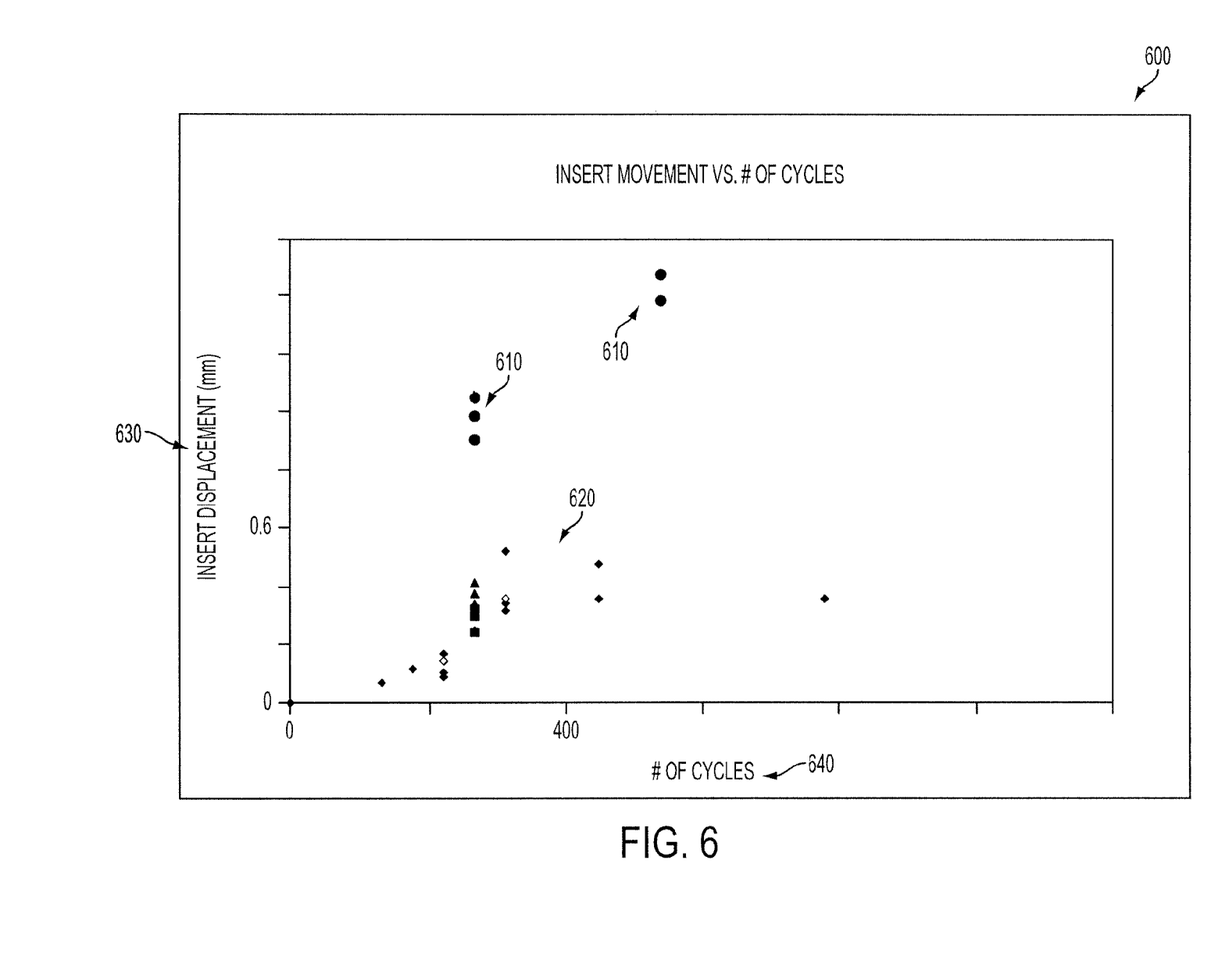
FIG. 6 is a chart comparing total insert movement of prior art electrodes with electrodes after cycling a plasma arc torch in accordance with an aspect of the invention.

FIG. 6 is a chart representing test data that compares total insert movement of prior art electrodes and electrodes after arc cycling a plasma arc torch in accordance with an aspect of the invention. Chart 600 shows total insert displacement 630 in various electrode configurations over the total number of thermal cycles 640. Arc cycles (or cutting cycles) of various prior art electrodes 620 show significantly less total movement at approximately the same total number of arc cycles than the total movement in electrode configurations in accordance with principles of the present invention 610. No known standard prior art electrodes 620 exceed 0.6 mm total movement. Prior art torch configurations depicted in electrode data points 620 include operating at transferred arc currents between at least 60 A and 105 A. Testing conditions during operation of a plasma torch included a plurality of 20 second cuts with 5 second intervals between each cut for evaluation of service life. When testing an electrode configuration in accordance with the present invention at 60 A, service life improved on average by at least 65% over Hypertherm standard prior art electrode configurations. When testing an electrode configuration in accordance with the present invention at 65 A, electrode life was improved on average at least by 100%, doubling the life of Hypertherm standard prior art electrodes.

Electrodes embodying the invention were also tested with electrode operating conditions including 80 A, resulting in a 60% increase of the life of the Hypertherm standard electrode, and at 85 A, which improved electrode life over Hypertherm standard prior art electrodes by at least 120%. Electrode configurations in accordance with the present invention tested at 100 A resulted in at least 150% increase in service life, and electrode configurations in accordance with embodiments of the present invention tested at 105 A resulted in at least 150% improvement in service life over Hypertherm standard prior art electrodes.

Electrode service life improvements were greatest when electrode configurations included radially swaging the insert into an electrode body formed of high purity copper containing at least 99.81% copper when the insert has an outer first diameter at a first end that was less than an inner second diameter at a second end of the insert. Electrode and insert configurations in accordance with principles of the present invention 610 can exceed 0.6 mm in total insert displacement 630 over approximately the same total number of thermal cycles 640 as the prior art electrodes 620. Although the test data in this chart stops at about 600 cut cycles, over 1,000 cut cycles have been achieved with some electrodes before electrode failure. At lower currents and shorter cut times cycles exceeding 3,000 have been achieved. This represents more than a two-fold increase in electrode life over previous Hypertherm standard electrodes.

Figure 7:
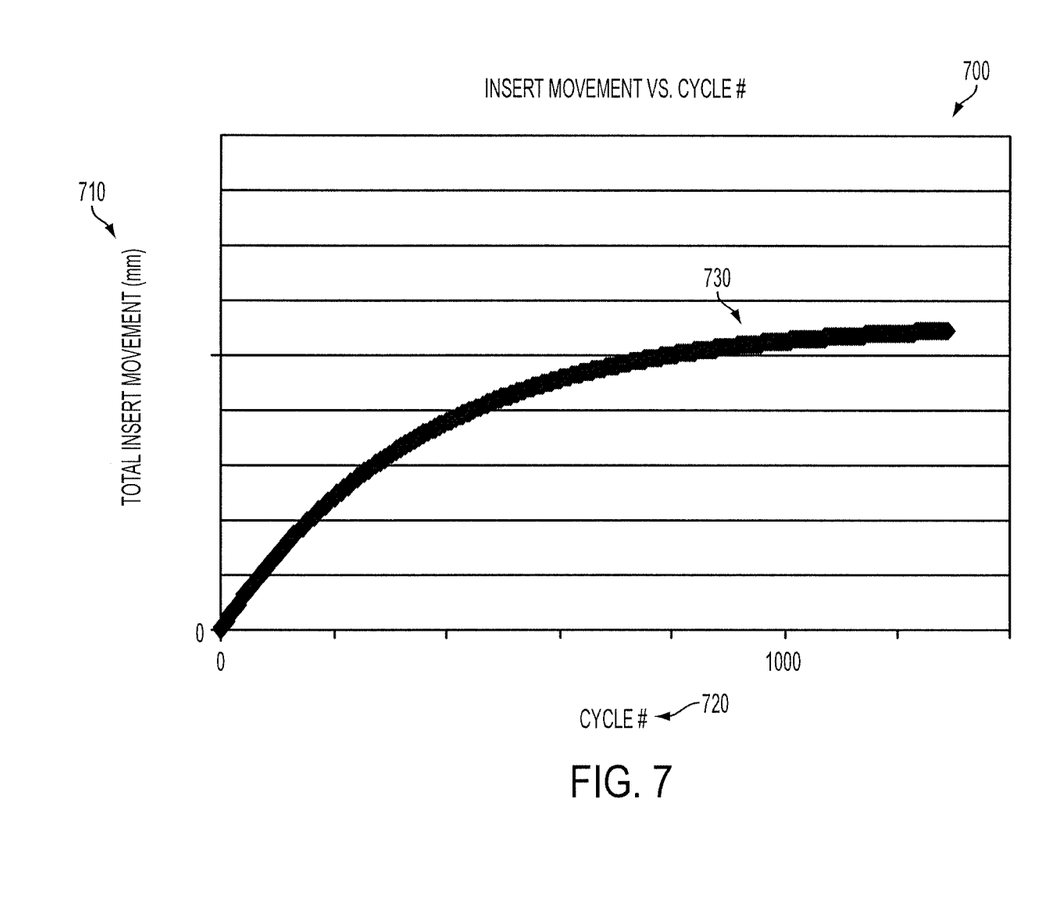
FIG. 7 is a chart depicting total insert movement of an electrode due to cycling a plasma arc torch.

The chart of FIG. 7 illustrates total movement of an elongated emissive insert configured in an electrode in accordance with principles of the present invention, the movement due to cycling over the entire service life of the electrode in a plasma arc cutting torch. Chart 700 shows insert movement 710 over the number of arc cycles 720. The number of cycles 720 in an electrode in accordance with principles of the present invention can exceed the total number of cycles 640 as depicted in FIG. 5. The rate of movement can be substantially linear for an initial plurality of arc cycles in an electrode in accordance with principles of the invention. The rate of movement per cycle 730 of the emissive insert can decrease as the number of arc cycles 720 of the insert approaches 1,000 cycles. Gap sizes 336 of over 2.0 mm can be achieved.

Figure 8:
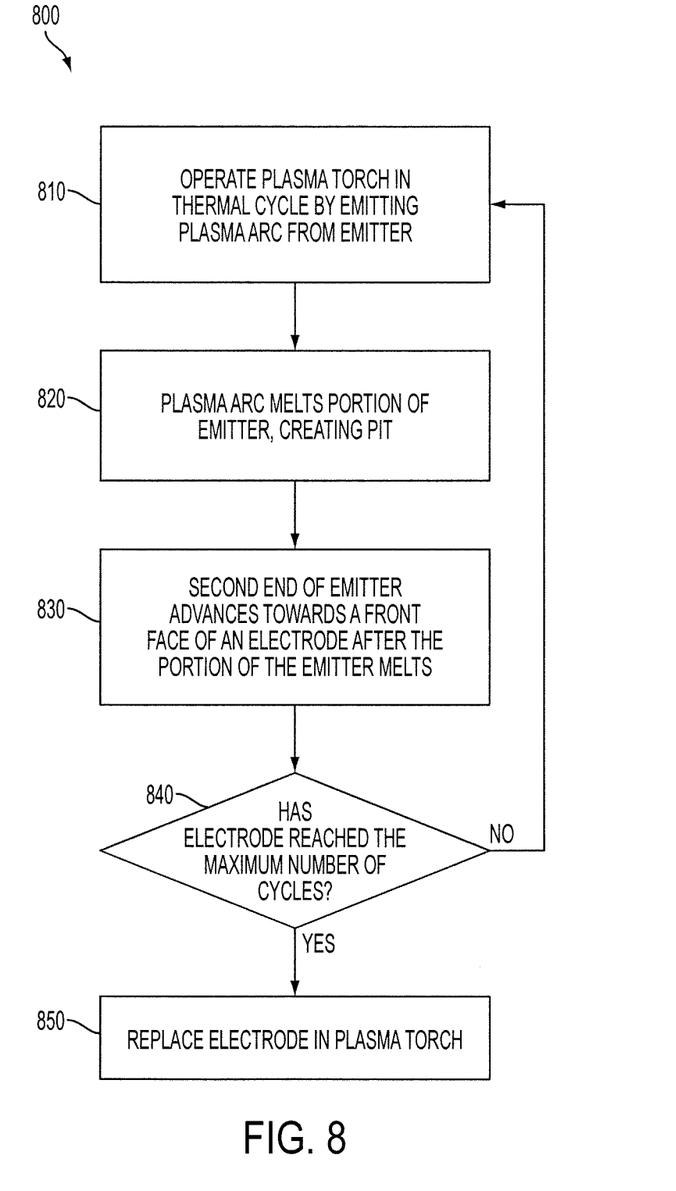
FIG. 8 is a flowchart depicting a method for enabling a prolonged electrode service life of an electrode in a plasma arc torch.

FIG. 8 is a flowchart 800 depicting a method for operating an electrode in a plasma arc cutting torch having a prolonged electrode service life. A plasma torch is operated in a cycle, e.g., as depicted in FIGS. 3B-D by emitting a plasma arc from an emitter 810. During the thermal cycle, the plasma arc melts a portion of the emitter at an outer surface of the emitter, creating a pit at the first end of the emitter 820. A second end of the emitter advances towards a front face of the electrode after the portion of the emitter melts 830. Multiple operations of the plasma torch can result in the electrode undergoing a plurality of thermal cycles. If the electrode has not reached the maximum number of thermal cycles 840, the steps 810-830 are repeated. When the electrode has reached the maximum number of thermal cycles 840, the electrode must be replaced in the plasma torch 850. In some embodiments, an electrode reaches the maximum number of cycles by monitoring the number of cycles run and replacing the electrode at a specified cycle number. In some embodiments, an electrode reaches the maximum number of cycles when an electrode fails.

Figure 9:
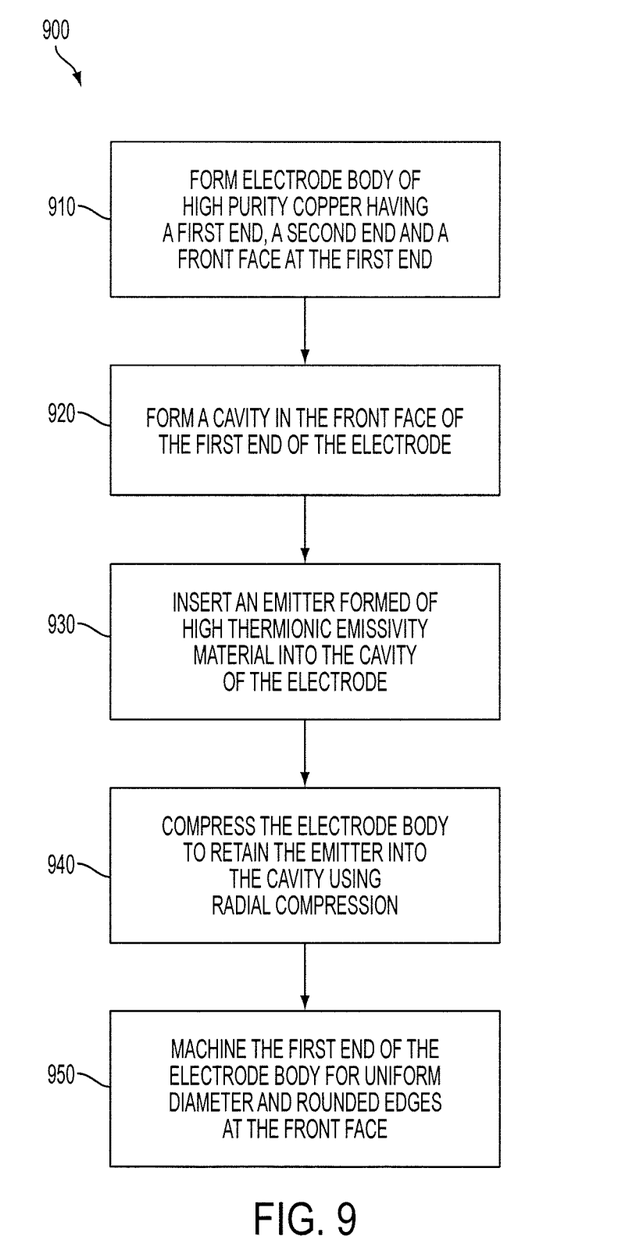
FIG. 9 is a flowchart depicting a method for manufacturing an electrode for a plasma arc torch in accordance with an embodiment of the invention.

FIG. 9 illustrates a method for manufacturing an electrode for a plasma arc torch in accordance with principles of the present invention. As shown in flowchart 900, an electrode body is formed of high purity copper containing at least 99.81% copper having a first end and a second end, with a front face at the first end 810, as shown in FIG. 2A. In some embodiments, the first end of the electrode is formed of high purity copper containing at least 99.81% copper. A cavity is formed in the front face of the first end of the electrode body 920, as shown in FIG. 2A. An emitter formed of high thermionic emissivity material into the cavity of the electrode body 830, as shown in FIG. 2B. In some embodiments, the emitter is formed of hafnium, zirconium, or tungsten. In some embodiments, the electrode body is compressed to retain the emitter into the cavity using radial compression 940, as shown in FIG. 2B. In some embodiments, a first end of the electrode body is machined to create a uniform diameter and rounded edges 950, as shown in FIG. 2C. In some embodiments, a first end of the insert is oriented towards the front face of the electrode and has a surface protruding beyond the front face of the electrode.

While the invention has been particularly shown and described with reference to specific preferred embodiments, it should be understood by those skilled in the art that various changes in from and detail may be made therein without departing from the spirit and scope of the invention as defined by the following claims.

What is claimed is:

1. An electrode for a plasma arc torch, the plasma arc torch including a plasma chamber defined by the electrode and a nozzle, the electrode comprising:
   an electrode body having a first end formed of high purity copper, containing at least 99.81% copper, a second end opposite the first end, and a front face located at the first end;
   a cavity in the front face of the electrode body; and
   an elongated insert formed of a high thermionic emissivity material disposed in the cavity, the insert having a first end and a second end, the first end oriented toward the front face of the electrode body, wherein a diameter of the first end is less than a diameter of the second end, such that the first end of the electrode body is configured to retain the first end of the insert, and
   wherein the exposure of higher temperatures creates thermal flexing in the insert which can allow the insert to advance towards the front face of the electrode body and the insert is configured to advance toward the front face during operation of the electrode such that the high thermionic emissivity material is replenished near the front face by the advancement of the insert.

2. The electrode of claim 1 wherein the first end of the electrode body is configured to retain the first end of the insert by radial compression.

3. The electrode of claim 1 wherein during an operation of the electrode the second end of the insert is advanced toward the front face of the electrode during arc cycles such that the second end of the insert advances at least 0.6 mm toward the front face.

4. The electrode of claim 3 wherein the advancement of the second end of the insert is at least 0.8 mm.

5. The electrode of claim 3 wherein the advancement of the second end of the insert is at least 1.0 mm.

6. The electrode of claim 3 wherein the advancement of the second end of the insert is at least 1.2 mm.

7. The electrode of claim 3 wherein the advancement of the second end of the insert is at least 1.4 mm.

8. The electrode of claim 3 wherein the advancement of the second end of the insert is at least 1.6 mm.

9. The electrode of claim 3 wherein the advancement of the second end of the insert is at least 2.0 mm.

10. The electrode of claim 1 wherein the electrode is gas-cooled.

11. The electrode of claim 1 wherein the insert extends out of the cavity away from the second end of the electrode body and beyond the front face.

12. A method for extending service life of an electrode for a plasma arc torch, the method comprising:
    forming a pit in a first end of an insert by melting a portion of the insert during an operation of the plasma arc torch, the insert formed of a high thermionic emissivity material having a diameter of the first end less than a diameter of a second end and disposed in a cavity in a front face at a first end of the electrode, the electrode formed of high purity copper containing at least 99.81% copper;
    thermal cycling the electrode by emitting a plasma arc from the insert during operation of the torch, the insert advancing toward the front face of the electrode in connection with the thermal cycling; and
    preventing a premature failure of the electrode during operation of the plasma arc torch due to the advancement of the second end of the insert toward the front face of the electrode by a distance of at least 0.6 mm,
    wherein preventing a premature failure of the electrode comprises the exposure of higher temperatures creating thermal flexing in the insert which can allow the insert to advance towards the front face of the electrode body and replenishing the high thermionic emissivity material near the front face of the electrode due to the advancement of the second end of the insert toward the front face of the electrode.

13. The method of claim 12 wherein the advancement of the second end of the insert is at least 0.8 mm.

14. The method of claim 12 wherein the insert comprises at least one of hafnium, zirconium, or tungsten.

15. The method of claim 12 wherein the advancement of the insert toward the front face of the electrode offsets a growth of a pit depth that results from the electrode cycling.

16. A method for manufacturing an electrode for a plasma arc torch, the plasma arc torch including a plasma chamber defined by an electrode and a nozzle, the method comprising:
    forming an electrode body having a first end formed of high purity copper containing at least 99.81% copper, a second end opposite the first end, and a front face located at the first end;
    forming a cavity in the front face of the electrode body;
    assembling an elongated insert formed of a high thermionic emissivity material in the cavity, the insert having a first end and a second end, the first end oriented toward the front face of the electrode body; and
    configuring the first end of the body to retain the first end of the insert using a radial compression of the first end of the electrode body, wherein the exposure of higher temperatures creates thermal flexing in the insert which can allow the insert to advance towards the front face of the electrode body and the insert is configured to advance toward the front face during operation of the electrode such that the high thermionic emissivity material is replenished near the front face by the advancement of the insert during operation of the plasma arc torch.

17. The method of claim 16 wherein the insert has a taper such that a first diameter at a first end of the insert is less than a second diameter at a second end of the insert, the first end near the front face of the electrode body.

18. The method of claim 17 wherein the second diameter is at least 0.003" greater than the first diameter.

19. The method of claim 18 wherein an insert length between the first diameter and the second diameter is between about 3.0 mm and 5.0 mm.

* * * * *